United States Patent [19]
Martz et al.

[11] Patent Number: 4,798,745
[45] Date of Patent: Jan. 17, 1989

[54] NON-YELLOWING COATING COMPOSITION BASED ON A HYDROXY COMPONENT AND AN ANHYDRIDE COMPONENT AND UTILIZATION IN A PROCESS OF COATING

[75] Inventors: Jonathan T. Martz, Glenshaw; James B. O'Dwyer, Valencia; Stephen J. Thomas, Aspinwall; James A. Claar, Export, all of Pa.

[73] Assignee: PPG Industries, Inc., Pittsburgh, Pa.

[21] Appl. No.: 88,327

[22] Filed: Aug. 24, 1987

[51] Int. Cl.$^4$ .......................... B05D 1/36; B05D 7/00; C08L 35/00; C08L 33/14
[52] U.S. Cl. ................................. 427/407.1; 427/409; 525/207; 525/223
[58] Field of Search .................. 427/385.5, 386, 388.2, 427/407.1, 409; 525/207, 223

[56] References Cited

U.S. PATENT DOCUMENTS

| | | | |
|---|---|---|---|
| 3,972,961 | 8/1976 | Hammer et al. | 260/857 |
| 4,069,275 | 1/1978 | Labana et al. | 260/836 |
| 4,101,606 | 7/1978 | Cenci et al. | 260/857 |
| 4,145,513 | 3/1979 | Dalibor | 528/75 |
| 4,163,739 | 8/1979 | Dalibor | 260/31.2 R |
| 4,177,183 | 12/1979 | Dalibor | 260/31.4 R |
| 4,308,188 | 12/1981 | Wicks et al. | 260/29.6 HN |
| 4,415,697 | 11/1983 | Peng et al. | 525/162 X |
| 4,452,948 | 6/1984 | Marrion et al. | 525/207 |
| 4,620,993 | 11/1986 | Suss et al. | 427/409 X |

FOREIGN PATENT DOCUMENTS 1417352 12/1975 United Kingdom .
1583316 1/1981 United Kingdom .

Primary Examiner—Michael Lusignan
Attorney, Agent, or Firm—Thomas M. Breininger

[57] ABSTRACT

Disclosed is a non-yellowing coating composition comprising: a hydroxy component having at least two free hydroxyl groups per molecule, and an anhydride component having at least two carboxylic acid anhydride groups per molecule. The anhydride component is derived from a mixture of monomers comprising greater than or equal to 11 percent by weight of an ethylenically unsaturated carboxylic acid anhydride, the balance of the mixture comprised of at least one vinyl comonomer. The molar ratio of the vinyl comonomer to the carboxylic acid anhydride in the mixture should be at least 1.0:1.0 and the ratio should be sufficient to provide a color standard number of less than 150. Typically, the coating composition is in the form of a two-package composition.

Also disclosed is a method of coating comprising: (I) coating a substrate with one or more applications of a pigmented basecoating composition to form a basecoat, and (II) coating the basecoat with one or more applications of a transparent topcoating composition to form a transparent topcoat, in which the basecoating composition and/or the topcoating composition comprises the aforesaid non-yellowing coating composition.

25 Claims, No Drawings

NON-YELLOWING COATING COMPOSITION BASED ON A HYDROXY COMPONENT AND AN ANHYDRIDE COMPONENT AND UTILIZATION IN A PROCESS OF COATING

BACKGROUND OF THE INVENTION

This invention relates to a coating composition based on a hydroxy component and an anhydride component which can provide durable, glossy, hardened films on a substrate and which resists yellowing when the hydroxy component and the anhydride component are mixed to form a liquid coating. The invention more specifically relates to such a coating composition suitable for use where hardening of the coating at low temperatures, for example, ambient temperatures, is required.

PRIOR ART

Known coating compositions which cure at low temperatures for use as automotive quality finishes, particularly as automotive refinishing compositions, include two-package compositions based on hydroxyl-functional components and curing (crosslinking) agents containing isocyanate groups. However, the use of isocyanate-functional materials often requires that precautions be taken with respect to the handling and use of the isocyanates based on toxicity considerations. Such precautions can be relatively burdensome particularly when the coating compositions are utilized in environments not involving controlled factory conditions as exist, for example, in plants producing new automotive vehicles. For example, the application of automotive refinishing compositions tends to be done in refinishing shops under conditions which are not nearly as well controlled as those existing in automotive plants which manufacture original equipment. Accordingly, there is a need for high quality coating compositions which are not based on the utilization of isocyanate curing agents.

U.S. Pat. No. 4,452,948 describes a coating composition comprising a hydroxy component, an anhydride component and an amine catalyst. However, known coatings based on these art known compositions, while providing a number of advantages particularly where low temperature curing is required, present certain problems with respect to use. It has been found, for example, that those compositions described by patentees, which may provide a number of advantageous properties, tend to yellow badly when the components of the coating composition are mixed together. Such yellowing is an important disadvantage, for example in automotive refinishing, where color matching with the old finish is often critical. Yellowing of the liquid coating composition at the time of application is thus a substantial disadvantage. Such yellowing, for example, is particularly disadvantageous, when it occurs in a topcoating composition for utilization in a "color plus clear" method of coating. This method involves coating a substrate with one or more applications of a pigmented basecoating composition to form a basecoat and thereafter coating the basecoat with one or more applications of a transparent topcoating composition to form a transparent topcoat. Upon hardening or curing, the resulting composite coating serves what would be considered to be the topcoat in a conventional method of coating in which a single coating composition serves to provide the topcoat.

The present invention is directed to providing a coating composition based on a hydroxy component and an anhydride component which can provide good appearance and durability properties and for which yellowing is substantially, or even entirely, eliminated. The present invention is also directed to providing a "color plus clear" method of coating based on a coating composition of the invention. Other objects of the invention will become apparent to the reader infra.

SUMMARY OF THE INVENTION

The present invention is for a non-yellowing coating composition comprising: (A) a hydroxy component having at least two free hydroxyl groups per molecule, and (B) an anhydride component having at least two carboxylic acid anhydride groups per molecule. The anhydride component is derived from a mixture of monomers comprising greater than or equal to 11 percent by weight of an ethylenically unsaturated carboxylic acid anhydride, the balance of the mixture comprised of at least one vinyl comonomer. It is important that the ethylenically unsaturated carboxylic acid anhydride comprise at least 11 percent by weight of the aforesaid mixture of monomers so as to provide sufficient crosslinking capability to make a product film having good durability properties. However, at this level, and higher levels, of anhydride content, the problem of yellowing of the coating composition upon admixture of the components in the presence of an amine catalyst is considerable. Therefore, in accordance with the invention, the molar ratio of the vinyl comonomer to the carboxylic acid anhydride in the aforesaid mixture is also important and should satisfy two criteria. The molar ratio of the vinyl comonomer to the carboxylic acid anhydride in the mixture should be at least 1.0:1.0 and the ratio should be sufficient to provide a color standard number of less than 150 according to ANSI/ASTM test method D 1209-69 when an amount of the anhydride component (B) sufficient to provide 27 grams of solids of said component is mixed with 1.0 gram of dimethylcocoamine and reduced with butyl acetate to a solids content of 22.5 percent by weight.

A coating composition of the invention when applied as a film to a substrate can be cured, typically in the presence of a suitable catalyst, to form a crosslinked coating. While not intending to be bound by any chemical theory, it is believed that curing a composition of the invention involves reaction of hydroxyl functionality from the hydroxy component with carboxylic acid anhydride functionality from the anhydride component. Typically, a coating composition of the invention is in the form of a two-package composition in which the hydroxy component is in a package separate from the anhydride component.

The invention is also for a method of coating comprising the steps of: (I) coating a substrate, typically a rigid substrate, with one or more applications of a pigmented basecoating composition to form a basecoat, and (II) coating the basecoat with one or more applications of a transparent topcoating composition to form a transparent topcoat, wherein at least one of the basecoating composition and the topcoating composition is a non-yellowing coating composition of the invention.

DETAILED DESCRIPTION OF THE INVENTION

A non-yellowing coating composition of the invention comprises: (A) a hydroxy component having at least two free hydroxyl groups per molecule, and (B) an anhydride component having at least two carboxylic acid anhydride groups per molecule derived from a mixture of monomers comprising greater than or equal to 11 percent by weight of an ethylenically unsaturated carboxylic acid anhydride the balance of the mixture comprised of at least one vinyl comonomer, the molar ratio of the vinyl comonomer to the carboxylic acid anhydride being at least 1.0:1.0 and sufficient to provide a color standard number of less than 150 according to ANSI/ASTM test method D 1209-69 when an amount of component (B) sufficient to provide 27 grams of solids of the component is mixed with 1.0 gram of dimethylcocoamine and reduced with butyl acetate to a solids content of 22.5 percent by weight. It has been found that when the molar ratio of the vinyl comonomer to the carboxylic acid anhydride in the aforesaid mixture is at least 1.3:1.0, admixture of the anhydride component with the hydroxy component in the presence of an amine catalyst typically will result in the product composition being essentially free, or free, of yellowing.

The coating composition when applied as a film to a substrate cures to form a crosslinked coating. Typically the coating composition can be cured to a tack free film at a temperature of less than 75 degrees Celsius within 4 hours, preferably at ambient temperature. A coating composition of the invention usually is in the form of a two package composition in which the hydroxy component is in a package separate from the anhydride component. At the time of application, the two packages simply are mixed together to form the resulting composition of the invention.

The hydroxy component (A) for a composition of the invention typically comprises a film-forming polymer. However, a hydroxy component which is not polymeric may be utilized. However, it is necessary that at least the combination of the anhydride component with the hydroxy component result in a film-forming system. Examples of hydroxy components for a composition of the invention include but are not limited to: (a) simple diols, triols and higher hydric alcohols also including those having additional functional groups such as the various aminoalcohols; (b) acrylic polyols; (c) polyester polyols; (d) polyether polyols; (e) amide-containing polyols; (f) epoxy polyols; (g) polyhydric polyvinyl alcohols; (h) cellulose and derivatives thereof (i) urethane polyols; and mixtures thereof.

(a) The simple diols, triols, and higher hydric alcohols are generally known, examples of which include but are not limited to: ethylene glycol; propylene glycol; 1,2-butanediol; 1,4-butanediol; 1,3-butanediol; 2,2,4-trimethyl-1,3-pentanediol; 1,5-pentanediol; 2,4-pentanediol; 1,6-hexanediol; 2,5-hexanediol; 2-methyl-1,3-pentanediol; 2-methyl-2,4-pentanediol; 2,4-heptanediol; 2-ethyl-1,3-hexanediol; 2,2-dimethyl-1,3-propanediol; 1,4-cyclohexanediol; 1,4-cyclohexanedimethanol; 1,2-bis(hydroxymethyl)cyclohexane; 1,2-bis(hydroxyethyl)cyclohexane; 2,2-dimethyl-3-hydroxypropyl-2,2-dimethyl-3-hydroxypropionate; diethylene glycol; dipropylene glycol; bis hydroxypropyl hydantoins; tris hydroxyethyl isocyanurate; the alkoxylation product of 1 mole of 2,2-bis(4-hydroxyphenyl)propane (i.e., bisphenol-A) and 2 moles of propylene oxide available as DOW-565 from DOW Chemical Company; monoethanolamine; diethanolamine; triethanolamine; N-methylmonoethanolamine; 2-hydroxymethyl-2-dimethylamino-1,3-propanediol; 2-hydroxymethyl-2-dimethylamino-1-propanol; and the like.

(b) Acrylic polyols include but are not limited to the known hydroxyl-functional addition polymers and copolymers of acrylic and methacrylic acids and their ester derivatives including but not limited to their hydroxyl-functional ester derivatives (e.g, the hydroxyalkyl acrylates and methacrylates), acrylamide and methacrylamide, and unsaturated nitriles such as acrylonitrile and methacrylonitrile. Additional examples of acrylic monomers which can be addition polymerized to form acrylic polyols include hydroxyethyl (meth)acrylate, hydroxypropyl (meth)acrylate, methyl (meth)acrylate, ethyl (meth)acrylate, propyl (meth)acrylate, isopropyl (meth)acrylate, butyl (meth)acrylate, t-butyl (meth)acrylate, 2-ethylhexyl (meth)acrylate, n-hexyl (meth)acrylate, cyclohexyl (meth)acrylate, 3,3,5-trimethylcyclohexyl (meth)acrylate, decyl (meth)acrylate, isodecyl (meth)acrylate, lauryl (meth)acrylate, stearyl (meth)acrylate, phenyl (meth)acrylate, and isobornyl (meth)acrylate.

(c) Polyester polyols are generally known and typically are prepared by conventional techniques utilizing simple diols, triols and higher hydric alcohols known in the art including but not limited to the previously described simple diols, triols, and higher hydric alcohols (optionally in combination with monohydric alcohols) with polycarboxylic acids. Examples of suitable polycarboxylic acids include: phthalic acid; isophthalic acid; terephthalic acid; trimellitic acid; tetrahydrophthalic acid, hexahydrophthalic acid; tetrachlorophthalic acid; adipic acid, azelaic acid, sebacic acid; succinic acid; malic acid; glutaric acid; malonic acid; pimelic acid; suberic acid; 2,2-dimethylsuccinic acid; 3,3-dimethylglutaric acid; 2,2-dimethylglutaric acid; maleic acid, fumaric acid, itaconic acid; and the like. Anhydrides of the above acids, where they exist, can also be employed and are encompassed by the term "polycarboxylic acid". In addition, certain materials which react in a manner similar to acids to form polyester polyols are also useful. Such materials include lactones such as caprolactone, propylolactone and methyl caprolactone, and hydroxy acids such as hydroxycaproic acid and dimethylolpropionic acid. If a triol or higher hydric alcohol is used, a monocarboxylic acid, such as acetic acid and benzoic acid, may be used in the preparation of the polyester polyol, and for some purposes, such a polyester polyol may be desirable. Moreover, polyester polyols are understood herein to include polyester polyols modified with fatty acids or glyceride oils of fatty acids (i.e., conventional alkyd polyols containing such modification). Another suitable polyester polyol is one prepared by reacting an alkylene oxide such as ethylene oxide, propylene oxide, butylglycidyl ether, and the glycidyl esters of organic acids such as CARDURA-E, with the carboxylic acid to form the corresponding ester.

Examples of the optional monohydric alcohols which may be used to prepare the polyester polyols include: ethanol, propanol, isopropanol, n-pentanol, neopentyl alcohol, 2-ethoxyethanol, 2-methoxyethanol, 1-hexanol, cyclohexanol, 2-methyl-2-hexanol, 2-ethylhexyl alcohol, 1-octanol, 2-octanol, 1-nonanol, 5-butyl-5-nonanol, isodecyl alcohol, and the like.

Alkyd polyols typically are produced by reacting polyhydric alcohols, polycarboxylic acids, and fatty acids derived from drying, semi-drying or non-drying oils in various proportions depending upon the extent of hydroxyl functionality and properties desired in the alkyd polyol. The techniques of preparing such alkyd polyols are well known generally. Usually, the process involves reacting together the polycarboxylic acid and fatty acid or partial glyceride thereof and the polyhydric alcohol (the latter usually in stoichiometric excess) in the presence of a catalyst such as litharge, sulfuric acid, or sulfonic acid to effect esterification with evolution of water. Examples of polyhydric alcohols typically used for preparation of the alkyd polyols include the simple diols, triols and higher hydric alcohols known in the art including but not limited to the previously described simple diols, triols, and higher hydric alcohols. Examples of polycarboxylic acids suitable for preparation of the alkyd polyols include those set forth previously in the description of polycarboxylic acids useful for preparing polyester polyols. Examples of suitable fatty acids include saturated and unsaturated acids such as stearic acid, oleic acid, ricinoleic acid, palmitic acid, linoleic acid, linolenic acid, licanic acid, elaeostearic acid, clupanodonic acid and mixtures thereof. The fatty acids may be in the form of the free acids with sufficient excess of the polyhydric alcohol being incorporated into the esterification mixture to compensate for their inclusion. However, in many instances, glyceride oils may be employed which have been partially alcoholized with sufficient amount of a polyhydric alcohol such as glycerol to supply the requisite amount of available hydroxyls for formation of the alkyd polyol.

(d) Polyether polyols are generally known. Examples of polyether polyols include but are not limited to the poly-(oxyethylene) glycols and poly-(oxypropylene) glycols prepared by the acid or base catalyzed addition of ethylene oxide or propylene oxide to initiators such as water, ethylene glycol, propylene glycol, diethylene glycol and dipropylene glycol and by the copolymerization of ethylene oxide and propylene oxide with initiator compounds such as trimethylolpropane, glycerol, pentaerythritol, sorbitol, sucrose and the like. Examples of polyether polyols also include the generally known poly-(oxytetramethylene) glycols prepared by the polymerization of tetrahydrofuran in the presence of Lewis acid catalysts such as boron trifluoride, tin (IV) chloride, antimony pentachloride, antimonytrichloride, phosphorous pentafluoride, and sulfonyl chloride. Other examples of polyether polyols include the generally known reaction products of 1,2-epoxide-containing compounds with polyols such as those included in the description of simple diols, triols, and higher hydric alcohols above.

(e) Amide-containing polyols are generally known and typically are prepared from any of the above-described diacids or lactones and diols, triols and higher alcohols, and diamines or aminoalcohols as illustrated, for example, by the reaction of neopentyl glycol, adipic acid and hexamethylenediamine. The amide-containing polyols also may be prepared through aminolysis by the reaction, for example, of carboxylates, carboxylic acids, or lactones with aminoalcohols. Examples of suitable diamines and aminoalcohols include hexamethylenediamine, ethylenediamine, phenylenediamines, toluenediamines, monoethanolamine, diethanolamine, N-methyl-monoethanolamine, isophorone diamine, 1,8-menthanediamine and the like.

(f) Epoxy polyols are generally known and can be prepared, for example, by the reaction of glycidyl ethers of polyphenols such as the diglycidyl ether of 2,2-bis (4-hydroxyphenyl) propane, with polyphenols such as 2,2-bis (4-hydroxyphenyl) propane. Epoxy polyols of varying molecular weights and average hydroxyl functionality can be prepared depending upon the ratio of starting materials used.

(g) Polyhydric polyvinyl alcohols are generally known and can be prepared, for example, by the addition polymerization of vinyl acetate in the presence of suitable initiators followed by hydrolysis of at least a portion of the acetate moieties. In the hydrolysis process, hydroxyl groups are formed which are attached directly to the polymer backbone. In addition to homopolymers, copolymers of vinyl acetate and monomers such as vinyl chloride can be prepare and hydrolyzed in similar fashion to form polyhydric polyvinyl alcohol-polyvinyl chloride copolymers.

(h) Cellulose and derivatives thereof, which contain hydroxyl functionality, are generally known. Examples include: cellulose; cellulose acetate, cellulose propionate, cellulose butyrate, cellulose acetate butyrate, ethyl cellulose, hydroxyethyl cellulose, and mixtures thereof.

(i) Urethane polyols are generally known and can be prepared, for example, by reaction of an organic polyisocyanate with a polyol. The organic polyisocyanate may be aromatic, aliphatic, cycloaliphatic, or heterocyclic and may be unsubstituted or substituted with groups such as halogen, etc. Examples of polyisocyanates useful in the preparation of urethane polyols include but are not limited to: toluene-2,4-diisocyanate, toluene-2,6-diisocyanate, and mixtures thereof; diphenylmethane-4,4'-diisocyanate, diphenylmethane-2,4'-diisocyanate and mixtures thereof; para-phenylene diisocyanate; biphenyl diisocyanate; 3,3'-dimethyl-4,4'-diphenylene diisocyanate; tetramethylene-1,4-diisocyanate; hexamethylene-1,6-diisocyanate; 2,2,4-trimethylhexane-1,6-diisocyanate; lysine methyl ester diisocyanate; bis(isocyanatoethyl)fumarate; isophorone diisocyanate; ethylene diisocyanate; dodecane-1,12-diisocyanate; cyclobutane-1,3-diisocyanate; cyclohexane-1,3-diisocyanate, cyclohexane-1,4-diisocyanate and mixtures thereof; methylcyclohexyl diisocyanate; hexahydrotoluene-2,4-diisocyanate, hexahydrotoluene-2,6-diisocyanate and mixtures thereof; hexahydrophenylene-1,3-diisocyanate, hexahydrophenylene-1,4-diisocyanate and mixtures thereof; perhydrodiphenylmethane-2,4'-diisocyanate, perhydrodiphenylmethane-4,4'-diisocyanate and mixtures thereof. It is to be understood that mixtures of polyisocyanates and monoisocyanates may be utilized as the organic polyisocyanate. Moreover, isocyanate prepolymers may be utilized as the polyisocyanate. Isocyanate prepolymers refer to the reaction products of a polyol and polyisocyanate in which the polyol and polyisocyanate are reacted, by the generally known prepolymer technique, in relative proportions to produce an isocyanato-functional product, namely the isocyanate prepolymer. Also, mixtures of organic isocyanate prepolymers with monomeric isocyanates (so-called semi-prepolymers) may be utilized in the prepolymer technique. Examples of polyols useful in the preparation of urethane polyols include those described in subsections (a) through (h) above.

Additional examples of the hydroxy component can be found in U.S. Pat. No. 4,452,948 which is hereby incorporated by reference, some of which additional examples include: graft copolymers of acrylic monomers including hydroxyalkyl acrylates and methacrylates onto unsaturated polyesters; and copolymers of allyl alcohol, for example styrene/allyl alcohol copolymers optionally containing allyl ether units.

Of the polyols described above for preparation of compositions of the invention, acrylic polyols and polyhydroxyl-functional esters are preferred, acrylic polyols being more preferred. The term "polyhydroxyl-functional esters" is intended to include both oligomeric ester polyols such as 2,2-dimethyl-3-hydroxypropyl-2,2-dimethyl-3-hydroxypropionate and polyester polyols described above.

The molecular weight of suitable organic polyols for preparation of compositions of the invention can vary within wide limits depending on the nature of the specific classes of polyols selected. The hydroxyl equivalent weight of organic polyols suitable for preparation of the resin compositions of the invention can vary widely. However, typically the number average molecular weight of suitable organic polyols can range from 62 to 50,000, preferably from 1,000 to 20,000; and the hydroxyl equivalent weight can range from 31 to 25,000, preferably from 500 to 10,000. When an acrylic polyol is utilized, which is preferred, its peak molecular weight as determined by gel permeation chromotography utilizing a polystyrene standard is generally in the range of from about 1,000 to about 50,000.

As discussed above, the anhydride component for a composition of the invention has at least two carboxylic acid anhydride groups per molecule. It is derived from a mixture of monomers comprising at least 11 percent, preferably at least 15 percent, by weight of an ethylenically unsaturated carboxylic acid anhydride, the balance of the mixture comprised of at least one vinyl comonomer. The molar ratio of the vinyl comonomer to the carboxylic acid anhydride in the mixture should be at least 1.0:1.0 and the ratio should be sufficient to provide a color standard number of less than 150 according to ANSI/ASTM test method D 1209-69 when an amount of the anhydride component (B) sufficient to provide 27 grams of solids of said component is mixed with 1.0 gram of dimethylcocoamine and reduced with butyl acetate to a solids content of 22.5 percent by weight. Examples of ethylenically unsaturated carboxylic acid anhydrides include: maleic anhydride, citraconic anhydride and itaconic anhydride, maleic anhydride being preferred. As used herein, the term "vinyl comonomer" or "vinyl monomer" is intended to include vinyl monomers such as styrene, alpha-methylstyrene, vinyl toluene, vinyl acetate and vinyl chloride, and is not intended to include acrylic monomers such as acrylic and methacrylic acids and their ester derivatives, examples of which can be found above in the description of the acrylic polyols. Aromatic vinyl monomers are preferred, styrene being particularly preferred. Acrylic monomers can be utilized in the aforesaid mixture of monomers comprising the ethylenically unsaturated carboxylic acid anhydride, but are not to be included within the meaning of the term "vinyl comonomer" or "vinyl monomer." For an anhydride component which is a film-forming polymer, the peak molecular weight as determined by gel permeation chromatography utilizing a polystyrene standard generally is in the range of about 1,000 to about 50,000.

The anhydride component can alternatively be an anhydride adduct of a diene polymer such as maleinized polybutadiene or a maleinized copolymer of butadiene, for example a butadiene/styrene copolymer. An anhydride adduct of an unsaturated fatty acid ester, for example a styrene/allyl alcohol copolymer esterified with an unsaturated fatty acid and maleinized, may also be used.

Typically, a coating composition of the invention additionally comprises an effective amount of a catalytic agent for accelerating the curing reaction between hydroxyl groups of the hydroxy component (A) and anhydride groups of the anhydride component (B). Most often, the catalytic agent comprises an amino group, preferably a tertiary amino group. The amino group may be present in the molecule of the hydroxy component (A) or in a separate amine compound such as, for example, dimethyl cocoamine, triethylamine, triethanolamine and phenolic compounds containing at least two dialkyl-amino groups. In a preferred embodiment, the amino group is in a separate amine compound. Usually, the amino group-containing catalytic agent is incorporated in the hydroxy component (A) of a composition of the invention as a separate amine compound. However, one or more amino groups may be incorporated in the hydroxy component as pendant groups in a hydroxyl-containing copolymer, for example, an acrylic polyol prepared utilizing a dialkyl-amino-alkyl acrylate or methacrylate such as dimethylaminoethyl acrylate, diethylaminoethyl acrylate, dimethylaminoethyl methacrylate and diethylaminoethyl methacrylate, or a dialkyl-amino-alkyl-substituted amide such as dimethylaminopropyl methacrylamide. Although less preferred, a secondary amine such as t-butylaminoethyl methacrylate may also be used. Alternatively, tertiary amine groups can be introduced into an acrylic polyol by copolymerizing glycidyl acrylate or methacrylate with other appropriate unsaturated comonomers and subsequently reacting the glycidyl groups with a secondary amine.

The hydroxy component (A) for use in a coating composition of the invention may be a mixture of a polymer containing hydroxyl but not amine groups with a polymer or compound containing hydroxyl and amine groups or the amine catalyst may be a separate amine compound not containing hydroxyl groups.

Generally the amounts of hydroxy component (A) and anhydride component (B) in a coating composition of the invention are selected to provide a ratio of equivalents of hydroxyl groups to equivalents of anhydride groups in a range of from 3:1 to 1:3. Typically the hydroxyl component and anhydride component are utilized to provide a ratio of equivalents of hydroxyl groups to equivalents of anhydride groups of 1:1.

The components of a composition of the invention generally are incorporated in an organic solvent and/or diluent in which the materials employed are compatible and soluble to the desired extent. Organic solvents which may be utilized include, for example, alcohols, ketones, aromatic hydrocarbons, esters or mixtures thereof. Illustrative of organic solvents of the above type which may be employed are alcohols such as ethanol, propanol, isopropanol, and butanol; ether alcohols such as ethylene glycol monoethyl ether, ethylene glycol monobutyl ether, propylene glycol monomethyl ether, and dipropylene glycol monoethyl ether; ketones such as methyl ethyl ketone, methyl N-butyl ketone, and methyl isobutyl ketone; esters such as butyl acetate; and aromatic hydrocarbons such as xylene, toluene, and naphtha.

In addition to the foregoing components, a coating composition of the invention may contain one or more optional ingredients, including various pigments of the type ordinarily utilized in coatings of this general class. In addition, various fillers; plasticizers; antioxidants; mildewcides and fungicides; surfactants; various flow control agents including, for example, thixotropes and additives for sag resistance and/or pigment orientation based on polymer microparticles (sometimes referred to as microgels); and other such formulating additives may be employed in some instances.

A coating composition of the invention can be applied to a substrate by any conventional method such as brushing, dipping, flow coating, roll coating, and spraying. Typically they are most often applied by spraying. The compositions may be applied over a wide variety of substrates such as wood, metals, glass, cloth, plastics, foams and the like, as well as over primers. The compositions of the invention have utility in general coating applications and can also be useful in specialty applications such as automotive paints including paints for automobile refinishing. Coating compositions of the invention have been found to be especially useful in the so-called "color plus clear" method of coating. Because of their low temperature curing properties as well as the excellent appearance and durability properties that they can provide in cured films, they are particularly suitable to automotive refinishing applications.

As discussed above, known coatings based on a hydroxy/anhydride curing mechanism tend to yellow when the components of the coating composition are mixed together, which creates problems particularly in light colored coating compositions, and especially with respect to transparent coating compositions for use, for example, as clear topcoating (or claarcoating) compositions in "color plus clear" systems for automotive refinishing. Coating compositions of the present invention essentially, or even totally, solve this problem while still providing an excellent cobbination of curing properties, as well as durability and appearance properties for cured films prepared from the compositions.

A coating composition of the invention can be cured by heating or without heating, typically at ambient temperature in the presence of a catalytic agent such as those described above. Once the hydroxy component (A) and the anhydride component (B) are brought in contact with each other, usually in the presence of a catalytic agent, the coating composition will begin to cure. Accordingly, it is desirable in some instances to prepare the compositions of this invention in the form of a two package system, i.e., one package containing the hydroxy component, often along with the aforesaid catalytic agent, and a second package containing the anhydride component.

A coating composition of the invention can be pigmented or unpigmented. Suitable pigments include a wide variety of pigments such as opaqu,, transparent and translucent pigments generally known for use in coating compositions. Metallic flake pigments and various uncolored, white, and colored pigments may be utilized as well as dyes. The particular advantage of coating compositions of the invention being non-yellowing as discussed above is particularly advantageous when the compositions are utilized in white, light colored, and clear forms, especially in coating applications where color matching is important. The compositions are particularly suited for use as crosslinking, clear topcoating compositions which cure to transparent, crosslinked films in "color plus clear" systems for automotive finishing applications, especially automotive refinishing applications. It should be noted that a preferred embodiment of the "color plus clear" method of the present invention is that in which the basecoating composition and the topcoating (or clearcoating) composition are allowed to dry or cure together.

Accordingly, the present invention is also for a method of coating comprising the steps of: (I) coating a substrate with one or more applications of a pigmented basecoating composition to form a basecoat, and (II) coating the basecoat with one or more applications of a transparent topcoating composition to form a transparent topcoat, wherein the basecoating composition and/or the topcoating composition is a non-yellowing coating composition of the invention. It is preferred that the transparent topcoating composition comprise a composition of the invention. Additionally, when only one of the basecoating and topcoating compositions is based on a coating composition of the invention, the other contains a film-forming system based on a thermoplastic and/or thermosetting film-forming resin typically selected from the generally known cellulosics, acrylics, aminoplasts, urethanes, polyesters, epoxies or mixtures thereof. These film-forming resins can be employed optionally in combination with various ingredients generally known for use in coating compositions containing film-forming resins of these general classes. Examples of these various ingredients include: fillers; plasticizers; antioxidants; mildewcides and fungicides; surfactants; various flow control agents including, for example, thixotropes and also additives described previously for sag resistance and/or pigment orientation based on polymer microparticles. It should be understood that the term "thermosetting" is being used in a broad sense to include any suitable crosslinking resin, even if crosslinking is effected without the application of heat.

The following examples illustrate the invention and should not be construed as a limitation on the scope thereof. Unless specifically indicated otherwise, all percentages and amounts are understood to be by weight. Wherever used herein "pbw" means parts by weight.

EXAMPLE 1

This example illustrates the preparation of an anhydride component from an ethylenically unsaturated carboxylic acid anhydride for utilization in a composition of the invention. The following monomers are used to make the anhydride component:

|  | Percent by Weight |
| --- | --- |
| Styrene | 46.8 |
| Maleic anhydride | 22.0 |
| Butyl acrylate | 15.6 |
| Methyl methacrylate | 15.6 |

A reaction vessel equipped with stirrer, thermometer, condenser and addition funnels is charged with 93.5 grams (g) of ethyl-3-ethoxy propionate (EktaPro EEP from Eastman Chemical Products) and 72.5 g of butyl acetate and heated to reflux, about 142 degrees Celsius (oC). Two feeds, identified herein as A and B, are next gradually and simultaneously added to the vessel over a period of three hours while the contents of the vessel are maintained at reflux conditions. Feed A consists of a mixture of 234.0 g styrene, 110.0 g maleic anhydride, 78.0 g butyl acrylate, 78.0 g methyl methacrylate, 93.8 g ethyl-3-ethoxy propionate and 72.5 g butyl acetate. Feed B consists of a mixture of 80.0 g of a 50 percent by weight solution of tertiary-butyl peroctoate in mineral spirits (LUPERSOL PMS from Pennwalt Corp.) and 34.2 g ethyl-3-ethoxy propionate. After the addition of the two feeds A and B is complete, the contents of the vessel are allowed to reflux for 1 hour after which a mixture of 5.0 g LUPERSOL PMS and 26.6 g of ethyl-3-ethoxy propionate is added to the vessel over a period of ½ hour followed by reflux for an additional 2 hours. Thereafter, heating is discontinued, 21.7 g butyl acetate is added to the vessel, and the contents of the vessel are allowed to cool to ambient temperature.

The resultant product contains a film-forming polymer derived from an ethylenically unsaturated carboxylic acid anhydride; has a total solids content measured for 1 hour at 110° C. of 58.0 percent by weight; has residual contents of methyl methacrylate, styrene, butyl acrylate, and maleic anhydride, respectively, of 0.37%, 0.11%, 0.13% and less than 0.01% by weight; has a peak molecular weight of 7443, a weight average molecular weight of 9837 and a number average molecular weight of 2945 as determined by gel permeation chromatography utilizing a polystyrene standard; and has an acid value of 64.8.

EXAMPLE 2

This example illustrates the preparation of an anhydride component from an ethylenically unsaturated carboxylic acid anhydride for utilization in compositions of the invention. The following monomers are used to make the anhydride component:

|                    | Percent by Weight |
|--------------------|-------------------|
| Styrene            | 46.8              |
| Maleic anhydride   | 22.0              |
| Butyl acrylate     | 15.6              |
| Methyl methacrylate| 15.6              |

A reaction vessel equipped as in Example 1 is charged with 93.8 g of ethyl-3-ethoxy propionate and 72.5 g of butyl acetate and heated to reflux, about 142° C. Two feeds, identified herein as A and B, are next gradually and simultaneously added to the vessel over periods of two hours and three hours, respectively, while the contents of the vessel are maintained at reflux conditions. Feed A consists of a mixture of 234.0 g styrene, 110.0 g maleic anhydride, 156.4 g ethyl-3-ethoxy propionate, and 120.9 g butyl acetate. Feed B consists of a mixture of 80.0 g of a 50 percent by weight solution of tertiary-butyl peroctoate in mineral spirits (LUPERSOL PMS from Pennwalt Corp.) and 34.2 g ethyl-3-ethoxy propionate. Thus, the addition of feed A to the vessel is completed one hour before the completion of the addition of feed B. Two hours into the addition of feed B, the gradual addition of a third feed, identified herein as feed C, consisting of a mixture of 78.0 g methyl methacrylate and 78.0 g butyl acrylate, is begun and is completed after one hour. Thus, the additions of feeds B and C are completed at the same time. Thereafter, reflux is continued for 1 hour after which a mixture of 5.0 g LUPERSOL PM$ and 26.6 g of ethyl-3-ethoxy propionate is added to the vessel over a period of ½ hour followed by reflux for an additional 2 hours. Thereafter, heating is discontinued, the contents of the vessel are allowed to cool, and 21.7 g butyl acetate is added to the vessel.

The resultant product contains a film-forming polymer derived from an ethylenically unsaturated carboxylic acid anhydride; has a total solids content measured for 1 hour at 110° C. of 52.4 percent by weight; has residual contents of methyl methacrylate, styrene, butyl acrylate, and maleic anhydride, respectively, of 0.41%, 0.09%, 0.08% and less than 0.01% by weight; has a peak molecular weight of 5829, a weight average molecular weight of 8441 and a number average molecular weight of 2926 as determined by gel permeation chromatography utilizing a polystyrene standard; has an acid value of 58.0; and has a color standard number according to the test described above (utilizing dimethylcocoamine) of 50.

EXAMPLE 3

This example illustrates the preparation of an anhydride component from an ethylenically unsaturated carboxylic acid anhydride for utiization in comparative compositions. The following monomers are used to make the anhydride component:

|                    | Percent by Weight |
|--------------------|-------------------|
| Styrene            | 25.0              |
| Maleic anhydride   | 22.0              |
| Butyl acrylate     | 25.0              |
| Methyl methacrylate| 28.0              |

A reaction vessel equipped as in Example 1 is charged with 375.0 g of ethyl-3-ethoxy propionate and 290.0 g of butyl acetate and heated to reflux, about 140 degrees ° C. Two feeds, identified herein as A and B, are next gradually and simultaneously added to the vessel over a period of three hours while the contents of the vessel are maintained at reflux conditions. Feed A consists of a mixture of 250.0 g styrene, 220.0 g maleic anhydride, 250.0 g butyl acrylate, and 280.0 g methyl methacrylate. Feed B consists of a mixture of 160.0 g of a 50 percent by weight solution of tertiary-butyl peroctoate in mineral spirits (LUPERSOL PMS from Pennwalt Corp.) and 68.3 g ethyl-3-ethoxy propionate. After the addition of the two feeds A and B is complete, the contents of the vessel are allowed to reflux for 1 hour after which a mixture of 10.0 g LUPERSOL PMS and 53.3 g of ethyl-3-ethoxy propionate is added to the vessel over a period of ½ hour followed by reflux for an additional 2 hours. Thereafter, heating is discontinued, 43.4 g butyl acetate is added to the vessel, and the contents of the vessel are allowed to cool to ambient temperature.

The resultant product contains a film-forming polymer derived from an ethylenically unsaturated carboxylic acid anhydride; has a total solids content measured for 2 hours at 150° C. of 56.6 percent by weight; has residual contents of methyl methacrylate, styrene, butyl acrylate, and maleic anhydride, respectively, of 0.04%, 0.01%, 0.03% and less than 0.01% by weight; has a peak molecular weight of 6376, a weight average molecular weight of 6810 and a number average molecular weight of 2537 as determined by gel permeation chromatography utilizing a polystyrene standard; and has a color standard number, determined according to the test (utilizing dimethylcocoamine) described above, of 500.

EXAMPLE 4

This example illustrates the preparation of three two-package, clear topcoating compositions (or clearcoating compositions) of the invention and two two-package comparative clear topcoating compositions. It also illustrates the excellent color properties of the clear topcoating compositions of the invention as compared to the comparative examples.

(a) Two compositions containing hydroxyl-functional acrylic resins are prepared by mixing the ingredients as set forth in the following Table 1. The resultant compositions are identified as compositions ACR-1 and ACR-2.

TABLE 1

| Acrylic Composition | Mass (grams) | |
|---|---|---|
| | ACR-1 | ACR-2 |
| Acrylic resin-1[1] | 104.2 | 0 |
| Acrylic resin-2[2] | 0 | 104.2 |
| Polysiloxane solution[3] | 1.0 | 1.0 |
| UV absorber[4] | 3.0 | 3.0 |
| Polybutylacrylate[5] | 1.3 | 1.3 |
| Flow control agent[6] | 0.3 | 0.3 |
| Butyl acetate | 59.5 | 59.5 |
| Dimethyl cocoamine[7] | 3.0 | 3.0 |
| Total mass | 172.3 | 172.3 |
| Total Solids | 69.3 | 69.3 |

[1] A solution of a hydroxyl-functional acrylic polymer having a peak molecular weight of 13500, a weight average molecular weight of 19000 and a number average molecular weight of 5592 (as determined by gel permeation chromatography using a polystyrene standard) made from 10.0% 2-hydroxyethyl acrylate, 14.8% TONE M-100 (an adduct of 1 mole of 2-hydroxyethyl acrylate with 2 moles of epsilon-caprolactone, obtained from Union Carbide), 14.1% styrene, 45.9% methyl methacrylate and 15.2% lauryl methacrylate at 60% by weight total solids (measured at 150° C. for 2 hours) in butyl acetate.
[2] A solution of a hydroxyl-functional acrylic polymer having a peak molecular weight of 13500, a weight average molecular weight of 19700 and a number average molecular weight of 5870 (as determined by gel permeation chromatography using a polystyrene standard) made from 10.0% 2-hydroxyethyl acrylate, 14.8% TONE M-100 (an adduct of 1 mole of 2-hydroxyethyl acrylate with 2 moles of epsilon-caprolactone, obtained from Union Carbide), 25.0% styrene, 35.0% methyl methacrylate and 15.2% lauryl methacrylate at 62% by weight total solids (measured at 150° C. for 2 hours) in butyl acetate.
[3] The polysiloxane is available from DOW Corning Corporation as DC 200, 135 csk. Dissolved in xylene to give a 0.5 percent polysiloxane content.
[4] Available from Ciba-Geigy Corp. as TINUVIN 328.
[5] A 56% by weight solution of polybutylacrylate in xylene available from Ford Motor Company as CH-5967-S2.
[6] Available as BYK 300 from BYK Mallinckrodt Chem. Produkte GmbH.
[7] ARMEEN DM12D from ARMAK Chemical Division, Arzona Inc.

(b) Three compositions based on polycarboxylic acid anhydride polymers (alternatively referred to as "anhydride compositions") are prepared by mixing the ingredients as set forth in the following Table 2. The resultant compositions are identified as compositions ANH-1, ANH-2 and ANH-3. ANH-1 and ANH-2 are for compositions of the invention, whereas ANH-3 is for comparative compositions.

TABLE 2

| Anhydride Composition | Mass (grams) | | |
|---|---|---|---|
| | ANH-1 | ANH-2 | ANH-3 |
| Product of Example 1 | 75.0 | 00.0 | 00.0 |
| Product of Example 2 | 00.0 | 78.1 | 00.0 |
| Product of Example 3 | 00.0 | 00.0 | 75.0 |
| Butyl acetate | 7.3 | 4.2 | 7.3 |
| Xylene | 6.9 | 6.9 | 6.9 |
| Total mass | 89.2 | 89.2 | 89.2 |
| Solids | 37.5 | 37.5 | 37.5 |

(c) Four two-package lear topcoating compositions (or clearcoating compositions) of the invention and two two-package comparative clear topcoating compositions are prepared by mixing the ingredients as set forth in the following Table 3. The resultant clearcoating compositions are identified as compositions CC-1, CC-2, CC-3, CC-4, CC-5 and CC-6. CC-1, CC-2, CC-3 and CC-4 are compositions of the invention whereas CC-5 and CC-6 are comparative compositions.

TABLE 3

| Clearcoating Composition | Mass (grams) | | | | | |
|---|---|---|---|---|---|---|
| | CC-1 | CC-2 | CC-3 | CC-4 | CC-5 | CC-6 |
| ACR-1 | 172.3 | 0 | 172.3 | 172.3 | 0 | 172.3 |
| ACR-2 | 0 | 172.3 | 0 | 0 | 172.3 | 0 |
| ANH-1 | 89.2 | 0 | 0 | 89.2 | 0 | 0 |
| ANH-2 | 0 | 89.2 | 89.2 | 0 | 0 | 0 |
| ANH-3 | 0 | 0 | 0 | 0 | 89.2 | 89.2 |
| Thinner[1] | 75.0 | 75.0 | 75.0 | 75.0 | 75.0 | 75.0 |
| Total Mass | 336.5 | 336.5 | 336.5 | 336.5 | 336.5 | 336.5 |
| Total Solids | 106.8 | 106.8 | 106.8 | 106.8 | 106.8 | 106.8 |

[1] A mixture of 16.3 pbw lactol spirits, 12.1 pbw toluene, 8.8 pbw VM&P naphtha, 11.0 pbw butyl acetate, 7.2 pbw ethyl-3-ethoxy propionate and 19.6 pbw heptyl acetate (available as Exxate 700 from EXXON).

A "Color Standard" number determined according to ANSI/ASTM test method D 1209-69 for each of the clearcoating compositions within 1 hour after the two components (ACR/ANH) of the clearcoating composition are mixed together. The higher the color standard number, the greater the intensity of a yellowish color of the sample, water being colorless. Color standard numbers range from 5 to 500. The results are as set forth in the following Table 4.

TABLE 4

| Clearcoating Composition | Color Standard Number |
|---|---|
| CC-1 | 80 |
| CC-2 | 70 |
| CC-3 | 75 |
| CC-4 | 80 |
| CC-5 | 250 |
| CC-6 | 250 |

As can be seen from Table 4, clearcoating compositions CC-1 through CC-4 of the invention had very much lower color standard numbers than the comparative clearcoating compositions CC-5 and CC-6.

EXAMPLE 5

This example illustrates the application, curing and resultant properties of coatings of the invention applied via a "color plus clear" method of the invention in which each of the clearcoating compositions of Example 4 (i.e., CC-1, CC-2, CC-3, and CC-4) is applied to a pigmented basecoating composition to form a resultant composite coating which is allowed to dry and cure at ambient atmospheric conditions. For completeness, the example also illustrates same for the comparative clearcoating compositions CC-5 and CC-6. The resultant, cured, composite coatings prepared utilizing clearcoating compositions CC-1, CC-2, CC-3, CC-4, CC-5 and CC-6 of Example 4 are identified herein, respectively, as CC-1', CC-2', CC-3', CC-4', CC-5' and CC-6'

The pigmented basecoating composition consists of 533 pbw of DBU-3207 (a blue metallic pigmented intermix color composition available from PPG INDUSTRIES, INC., PPG FINISHES) and 533 pbw of DBX 695 (an acrylic resin composition available from PPG INDUSTRIES, INC., PPG FINISHES).

The basecoating composition is reduced 150 percent by volume with a lacquer thinner available as DT 170 from PPG INDUSTRIES, INC., PPG FINISHES, (i.e., 1 part by volume basecoating composition to 1.5 parts by volume lacquer thinner). The basecoating composition is spray applied to 24 gauge cold rolled steel panels (treated with BONDERITE 40, primed with a two-package, acrylic urethane primer surfacer available as K-200/K-201 from PPG INDUSTRIES, INC., PPG FINISHES, and sanded with No. 400 grit paper, and sealed with DP-40/401, a two component epoxy primer from PPG INDUSTRIES, INC., PPG FINISHES reduced 100% by volume with DTU 800, a thinner from PPG INDUSTRIES, INC., PPG FINISHES) to form the basecoats.

The basecoats are allowed to flash for ½ hour at room temperature. Immediately thereaftar, the clearcoating compositions (see Table 3) are spray applied to the basecoats to form clear topcoats (clearcoats). The composite basecoat/clearcoat films are allowed to cure at ambient atmospheric conditions.

The resultant properties for the cured composite films are as set forth in the following Table 5. The following terms and abbreviations in Table 5 have the meanings set forth below.

"BC" means basecoat and "CC" maans clearcoat.

"Tack Time" refers to the period in minutes after which the coating does not feel tacky to the touch.

"Tape time" is the minimum time in hours after application of the coating composition to the substrate after which a strip of masking tape can be applied and ripped from the film without resulting in any permanent marking of the film.

"DFT" means dry film thickness in mills.

"20° Gloss" means "20 degree gloss" as conventionally measured.

"DOI" means "distinctness of image" measured 24 hours after application of the clearcoating composition to the basecoat. The two values in each set represent measurements made on each of two different panels for the respective composite coating.

"Sward" refers to Sward Hardness as conventionally measured.

"Pencil" refers to Pencil Hardness as conventionally measured.

"Gasoline soak" means resistance to deterioration by the composite film to soaking for 3 minutes in gasoline. For gasoline soak a rating of 1 means excellent; a rating of 2 means good; a rating of 3 means fair; and a rating of 5 means very poor.

"Adhesion" refers to cross-hatch adhesion of the composite film to the substrate 96 hours after application determined according to ASTM test method D3359. The values for this test range from 0 to 5. A value of 5 for this test means that there was no adhesion failure (or no "pickoff") of the composite coating in any manner.

"Repair" means that after 24 hours the composite film is sanded down to the steel substrate forming a bare area of metal surrounded by a feather-edge of film. The area to be repaired is rinsed with water to remove the powdery material and dried. Next the area to be repaired is wiped with a tar and wax remover available as DX-330 from PPG INDUSTRIES, INC., PPG FINISHES. Next the basecoating composition is spray applied to the area to be repaired and observed for any wrinkling or lifting in the feather-edge area. A rating of "pass" means that there was no noticeable wrinkling or lifting in the feather-edge area.

"Gel time" means the time it takes after mixing of the two components of the clearcoating composition for the clearcoating composition to gel.

"Direct Impact" is measured in inch-pounds and the value is determined at the point at which the coating cracks on impact.

"Humidity" refers to humidity resistance determined utilizing a humidity chamber operating at 100 percent relative humidity at 37.8 degrees Celsius. The values in the table are 20 degree gloss readings for the composite coatings before placing them in the humidity chamber (i.e., 0 hours) and after 96 hours in the humidity chamber.

"Blister-H" refers to the resistance to blistering of the composite coatings after 96 hours in the humidity chamber as described above. The values are determined according to "Blistering Resistance," *Pictorial Standards Of Coatings Defects,* 1979 by Federation of Societies of Coating Technology. The number correlates with size, 10 being no blisters at all, 9 meaning very small, and 1 meaning very large. The letter refers to the density of blisters on the panel, F meaning few, M meaning medium, MD meaning medium dense, and D meaning dense. A value of 9 M means that the blisters are very small and of medium density and represents good humidity resistance in this test.

"Adhesion-H" represents the refers to cross-hatch adhesion of the composite film to the substrate after 96 hours in the humidity chamber described above, and is determined according to ASTM test method D3359.

"QUV" refers to the 20 degree gloss readings for the composite coatings after subjecting the coated substrates to cycles of ultraviolet light and condensing relative humidity in a "QUV Accelerated Weathering Tester" from the Q-Panel Company, Cleveland, Ohio, for the times set forth in the Table.

TABLE 5

| Composite Film | Tack Time | Tape Time | DFT BC/CC 24 Hr/96 Hr | 20° Gloss 24 Hr/96 Hr | DOI 24 Hr | Sward 24 Hr/96 Hr | Pencil 24 Hr/96 Hr | Gasoline 24 Hr/96 Hr | Adhesion 96 Hr | Repair 96 Hr | Gel Time Hrs |
|---|---|---|---|---|---|---|---|---|---|---|---|
| BC/CC-1' | 30 | 24 | 1.0/2.5 | 91/90 | 40/40 | 4/12 | 6B/2B | 3/1 | 5 | Pass | 6.50 (CC-1) |
| BC/CC-2' | 30 | 24 | 1.0/2.1 | 93/92 | 35/35 | 6/12 | 4B/2B | 3/1 | 5 | Pass | 4.25 (CC-2) |
| BC/CC-3' | 30 | 24 | 1.0/2.2 | 91/91 | 45/40 | 6/12 | 6B/2B | 3/1 | 5 | Pass | 3.25 (CC-3) |
| BC/CC-4' | 30 | 24 | 1.0/2.3 | 93/92 | 40/50 | 6/12 | 6B/2B | 3/1 | 5 | Pass | 4.75 (CC-4) |
| BC/CC-5' | 30 | 24 | 1.0/2.2 | 90/91 | 45/50 | 6/12 | 5B/2B | 3/1 | 5 | Pass | 8.25 (CC-5) |
| BC/CC-6' | 30 | 24 | 1.0/2.2 | 88/87 | 50/45 | 6/12 | 6B/2B | 3/1 | 5 | Pass | 9.25 (CC-6) |

| Composite Film | Direct Impact inch/lb | Humidity 0 Hr/96 Hr | Blister-H | Adhesion-H | QUV 0 Hr/167 Hr/477 Hr/980 Hr/1576 Hr |
|---|---|---|---|---|---|
| BC/CC-1' | 50 | 88/84 | 9M | 5 | 82 / 90 / 87 / 86 / 15 |
| BC/CC-2' | 40 | 90/84 | 9M | 5 | 91 / 92 / 89 / 77 / 8 |
| BC/CC-3' | 50 | 89/86 | 9M | 5 | 87 / 87 / 86 / 83 / 6 |
| BC/CC-4' | 50 | 90/86 | 9M | 5 | 89 / 92 / 90 / 82 / 24 |
| BC/CC-5' | 50 | 86/81 | 9M | 5 | 70 / 80 / 83 / 86 / 15 |
| BC/CC-6' | 50 | 88/80 | 9M | 5 | 88 / 83 / 86 / 86 / 70 |

EXAMPLES 7, 8, 9, 10, 11, 12 and 13

This example illustrates the importance of utilizing a proper level of ethylenically unsaturated carboxylic acid anhydride as well as a proper ratio of vinyl comonomer to carboxylic acid anhydride in preparing anhydride components suitable for compositions of the invention to achieve not only good non-yellowing characteristics of compositions of the invention, but also good properties in films made from compositions of the invention.

(a) Anhydride components are prepared in a manner similar to that described in Example 1 above. The percents by weight of the monomers utilized as well as characteristics of the resulting anhydride components are as set forth in the following Table 6. In Table 6, "Color No." means the color standard number of the anhydride component as determined according to the test defined previously herein and "Sty," "M-anh," "MMA," and "BA" mean styrene, maleic anhydride, methyl methacrylate and butyl acrylate respectively. The "% Solids" refers to the solids content of the anhydride component determined for 1 hour at 110° C. "AV" stands for "acid value," "Mw" for "weight average molecular weight," "Mn" for number average molecular weight, and "Mp" for "peak molecular weight." Mn, Mw and Mp are determined by gel permeation chromatography using a polystyrene standard. Examples 7, 8 and 12 represent anhydride components suitable for compositions of the invention, whereas examples 9 through 11 represent anhydride components for comparative compositions. It should be noted that example 10 is prepared from components set forth in Example 3 of of U.S. Pat. No. 4,452,948 except that butyl acetate is utilized as thinning solvent instead of 2-ethoxyethyl acetate. It is believed that this minor difference should not make any essential difference in the respective product compositions.

TABLE 7

| Acrylic Composition | Mass (grams) | | | | |
|---|---|---|---|---|---|
| | OHR-7 | OHR-8 | OHR-9 | OHR-10 | OHR-11 |
| Acrylic resin-1[1] | 104.2 | 76.2 | 0 | 39.8 | 128.8 |

TABLE 7-continued

| Acrylic Composition | Mass (grams) | | | | |
|---|---|---|---|---|---|
| | OHR-7 | OHR-8 | OHR-9 | OHR-10 | OHR-11 |
| resin-1[1] | | | | | |
| Acrylic resin-2[2] | 0 | 0 | 104.2 | 0 | 0 |
| Polysiloxane Solution[3] | 1.0 | 1.0 | 1.0 | 1.0 | 1.0 |
| UV absorber[4] | 3.0 | 3.0 | 3.0 | 3.0 | 3.0 |
| Polybutylacrylate[5] | 1.3 | 1.3 | 1.3 | 1.3 | 1.3 |
| Flow control agent[6] | 0.3 | 0.3 | 0.3 | 0.3 | 0.3 |
| Butyl acetate | 59.5 | 59.5 | 59.5 | 59.5 | 46.6 |
| Dimethyl cocoamine[7] | 3.0 | 3.0 | 3.0 | 3.0 | 3.0 |
| Total mass | 172.3 | 144.3 | 172.3 | 107.9 | 182.0 |

[1]A solution of a hydroxyl-functional acrylic polymer having a peak molecular weight of 13500, a weight average molecular weight of 19000 and a number average molecular weight of 5592 (as determined by gel permeation chromatography using a polystyrene standard) made from 10.0% 2-hydroxyethyl acrylate, 14.8% TONE M-100 (an adduct of 1 mole of 2-hydroxyethyl acrylate with 2 moles of epsilon-caprolactone, obtained from Union Carbide), 14.1% styrene, 45.9% methyl methacrylate and 15.2% lauryl methacrylate at 60% by weight total solids (measured at 150° C. for 2 hours) in butyl acetate.
[2]A solution of a hydroxyl-functional acrylic polymer having a peak molecular weight of 13500, a weight average molecular weight of 19700 and a number average molecular weight of 5870 (as determined by gel permeation chromatography using a polystrene standard) made from 10.0% 2-hydroxyethyl acrylate, 14.8% TONE M-100 (an adduct of 1 mole of 2-hydroxyethyl acrylate with 2 moles of epsilon-caprolactone, obtained from Union Carbide), 25.0% styrene, 35.0% methyl methacrylate and 15.2% lauryl methacrylate at 62% by weight total solids (measured at 150° C. for 2 hours) in butyl acetate.
[3]The polysiloxane is available from DOW Corning Corporation as DC 200, 135 csk. Dissolved in xylene to give a solution having a 0.5 percent polysiloxane content.
[4]Available from Ciba-Geigy Corp. as TINUVIN 328.
[5]A 56% by weight solution of polybutylacrylate in xylene available from Ford Motor Company as CH-5967-S2.
[6]Available as BYK 300 from BYK Mallinckrodt Chem. Produkte GmbH.
[7]ARMEEN DM12D from ARMAK Chemical Division, Arzona Inc.

TABLE 6

| Example | Color No. | % Sty | % M-anh | % MMA | % BA | Sty/M-anh Molar Ratio | % Solids | AV | Mp | Mw | Mn | Residual Monomer Content | | | |
|---|---|---|---|---|---|---|---|---|---|---|---|---|---|---|---|
| | | | | | | | | | | | | MMA | Sty | BA | M-anh |
| 7 | 80 | 46.8 | 22.0 | 15.6 | 15.6 | 2.00 | 57.1 | 64.5 | 6116 | 7595 | 3090 | 0.37% | 0.11% | 0.13% | <0.01% |
| 8 | 100 | 25.0 | 11.0 | 39.0 | 25.0 | 2.14 | 56.1 | 21.1 | 6241 | 7096 | 2892 | 0.44% | 0.05% | 0.07% | <0.01% |
| 9 | 500 | 25.0 | 22.0 | 28.0 | 25.0 | 1.07 | 56.6 | — | 6376 | 6810 | 2537 | 0.04% | 0.01% | 0.03% | <0.01% |
| 10 | 10 | 32.8 | 4.1 | 28.2 | 34.9 | 7.54 | 67.7 | 14.2 | 17452 | 28861 | 9226 | 0.11% | 0.04% | 0.05% | <0.01% |
| 11 | 65 | 0 | 4.1 | 61.0 | 34.9 | 0 | 69.4 | 11.2 | 17499 | 23206 | 5400 | 0.13% | 0 | 0.42% | <0.01% |
| 12 | 65 | 58.5 | 41.5 | 0 | 0 | 1.3 | 40.9 | 93.3 | 5833 | 5922 | 2028 | — | 0.25% | — | <0.01% |

(b) Five compositions containing hydroxyl-functional resins are prepared by mixing the ingredients as set forth in the following Table 7. The resultant compositions are identified as compositions OHR-7 through OHR-11.

(c) Eight compositions based on polycarboxylic acid anhydride polymers (alternatively referred to as "anhydride compositions") are prepared by mixing the ingredients as set forth in the following Table 8. The resultant compositions are identified as compositions ANH-7, ANH-8, ANH-9, ANH-10, ANH-11, ANH-12 and ANH-13. ANH-7 and ANH-8 are for compositions of the invention, whereas ANH-9 through ANH-13 are for comparative compositions.

TABLE 8

| Anhydride Composition | Mass (grams) | | | | | | | |
|---|---|---|---|---|---|---|---|---|
| | ANH-7 | ANH-8 | ANH-9 | ANH-10 | ANH-11 | ANH-12 | ANH-13 | ANH-14 |
| Product of Example 7 | 75.0 | 0 | 0 | 0 | 0 | 0 | 0 | 0 |
| Product of Example 8 | 0 | 101.5 | 0 | 0 | 0 | 0 | 0 | 0 |
| Product of Example 9 | 0 | 0 | 75.0 | 0 | 0 | 0 | 0 | 0 |
| Product of Example 10 | 0 | 0 | 0 | 117.1 | 0 | 146.0 | 0 | 0 |
| Product of Example 11 | 0 | 0 | 0 | 0 | 113.9 | 0 | 146.0 | 0 |
| Product of Example 12 | 0 | 0 | 0 | 0 | 0 | 0 | 0 | 63.7 |
| Butyl acetate | 7.3 | 8.9 | 7.3 | 29.6 | 32.8 | 50.0 | 50.0 | 8.9 |
| Xylene | 6.9 | 6.9 | 6.9 | 6.9 | 6.9 | 0 | 0 | 6.9 |
| Polysiloxane Solution[1] | 0 | 0 | 0 | 0 | 0 | 1.0 | 1.0 | 0 |
| UV absorber[2] | 0 | 0 | 0 | 0 | 0 | 3.0 | 3.0 | 0 |
| Polybutylacrylate[3] | 0 | 0 | 0 | 0 | 0 | 1.3 | 1.3 | 0 |

TABLE 8-continued

| Anhydride Composition | Mass (grams) | | | | | | | |
|---|---|---|---|---|---|---|---|---|
| | ANH-7 | ANH-8 | ANH-9 | ANH-10 | ANH-11 | ANH-12 | ANH-13 | ANH-14 |
| Flow control agent[4] | 0 | 0 | 0 | 0 | 0 | 0.3 | 0.3 | 0 |
| Total mass | 89.2 | 117.3 | 89.2 | 153.6 | 153.6 | 201.6 | 201.6 | 79.5 |

[1]As described in footnote 3 to Table 7.
[2]As described in footnote 4 to Table 7.
[3]As described in footnote 5 to Table 7.
[4]As described in footnote 6 to Table 7.

(d) Three two-package, clear topcoating compositions (or clearcoating compositions) of the invention and seven two-package comparative clear topcoating compositions are prepared by mixing the ingredients as set forth in the following Table 9. The resultant clearcoating compositions are identified as compositions CC-7, CC-8, CC-9, CC-10, CC-11, CC-12, CC-13 and CC-14. CC-7, CC-8 and CC-14 are compositions of the invention whereas CC-9 through CC-13 are comparative compositions.

TABLE 9

| Clearcoating Composition | Mass (grams) | | | | | | | |
|---|---|---|---|---|---|---|---|---|
| | CC-7 | CC-8 | CC-9 | CC-10 | CC-11 | CC-12 | CC-13 | CC-14 |
| OHR-7 | 172.3 | 0 | 0 | 0 | 0 | 0 | 0 | 0 |
| OHR-8 | 0 | 144.3 | 0 | 0 | 0 | 0 | 0 | 0 |
| OHR-9 | 0 | 0 | 172.3 | 0 | 0 | 0 | 0 | 0 |
| OHR-10 | 0 | 0 | 0 | 107.9 | 107.9 | 0 | 0 | 0 |
| OHR-11 | 0 | 0 | 0 | 0 | 0 | 0 | 0 | 182.0 |
| ANH-7 | 89.2 | 0 | 0 | 0 | 0 | 0 | 0 | 0 |
| ANH-8 | 0 | 117.3 | 0 | 0 | 0 | 0 | 0 | 0 |
| ANH-9 | 0 | 0 | 89.2 | 0 | 0 | 0 | 0 | 0 |
| ANH-10 | 0 | 0 | 0 | 153.6 | 0 | 201.6 | 0 | 0 |
| ANH-11 | 0 | 0 | 0 | 0 | 153.6 | 0 | 201.6 | 0 |
| ANH-14 | 0 | 0 | 0 | 0 | 0 | 0 | 0 | 79.5 |
| Triethanolamine | 0 | 0 | 0 | 0 | 0 | 5.1 | 5.1 | 0 |
| Butyl acetate | 0 | 0 | 0 | 0 | 0 | 54.8 | 54.8 | 0 |
| Thinner[1] | 75. | 75.0 | 75.0 | 75.0 | 75.0 | 75.0 | 75.0 | 75.0 |
| Total Mass | 336.5 | 336.6 | 336.5 | 336.5 | 336.5 | 336.5 | 336.5 | 336.5 |

[1]A mixture of 16.3 pbw lactol spirits, 12.1 pbw toluene, 8.8 pbw VM&P naphtha, 11.0 pbw butyl acetate, 7.2 pbw ethyl-3-ethoxy propionate and 19.6 plw heptyl acetate (available as Exxate 700 from EXXON).

A "Color Standard" number is determined according to ANSI/ASTM test method D 1209-69 for each of the clearcoating compositions within 1 hour after the two components (OHR/ANH) of the clearcoating composition are mixed together. The results are as set forth in the following Table 10.

TABLE 10

| Clearcoating Composition | Color Standard Number |
|---|---|
| CC-7 | 75 |
| CC-8 | 80 |
| CC-9 | 200 |
| CC-10 | 50 |
| CC-11 | 100 |
| CC-12 | 60 |
| CC-13 | 60 |
| CC-14 | 90 |

(e) This part illustrates the application, curing and resultant properties of coatings applied via a "color plus clear" method in which each of the clearcoating compositions of part (d) immediately above (i.e., CC-7, CC-8, CC-9, CC-10, CC-11, CC-12, CC-13 and CC-14) is applied to a pigmented basecoating composition to form a resultant composite coating which is allowed to dry and cure at ambient atmospheric conditions. The resultant, cured, composite coatings prepared utilizing clearcoating compositions CC-7, CC-8, CC-9, CC-10, CC-11, CC-12, CC-13 and CC-14 are identified herein, respectively, as CC-7', CC-8', CC-9', CC-10', CC-11', CC-12', CC-13' and CC-14'.

The pigmented basecoating composition is the same as that described in Example 5. The basecoating composition is reduced as described in Example 5 and spray applied to treated, primed, sanded and sealed steel panels in the same manner as described in Example 5 to form the basecoats.

The basecoats are allowed to flash for ½ hour at room temperature. Immediately thereafter, the clearcoating compositions (see Table 9) are spray applied to the basecoats to form clear topcoats (clearcoats). The composite basecoat/clearcoat films are allowed to cure at ambient atmospheric conditions. The resultant properties for the cured composite films are as set forth in the following Table 11. Terms and abbreviations set forth in Table 11 which are the same as those set forth in Table 5 have the same meanings. The term, "Appearance," in Table 11 refers to the appearance of the composite film after the 96 hour humidity test.

TABLE 11

| Composite Film | Pencil 24 Hr/ 96 Hr | Gasoline 24 Hr/ 96 Hr | Humidity 0 Hr/96 Hr | Appearance |
|---|---|---|---|---|
| BC/CC-7' | 6B/B | 1—/1 | 97/87 | OK |
| BC/CC-8' | <6B/B | 3/3 | 89/78 | Slightly water spotted |
| BC/CC-9' | <6B/4B | 3/1— | 90/77 | Blister-H = 9F |
| BC/CC-10' | 6B/4B | 5/5 | 92/55 | Water spotted |
| BC/CC-11' | <6B/4B | 5/3 | 84/34 | Water spotted |
| BC/CC-12' | <6B/4B | 5/5 | 73/0 | Very water spotted, Very blushed |
| BC/CC-13' | <6B/4B | 5/4 | 80/0 | Very water spotted, Very blushed |
| BC/CC-14' | 6B/B | 1—/1 | 93/89 | OK |

It also should be noted that the "Tape Time" for BC/CC-12' and BC/CC-13' is much greater than 24 hours.

As illustrated in these examples, too low a level of anhydride component tends to result in films having poor solvent (gasoline) and humidity resistance which is an indication that the films probably are poorly crosslinked; whereas coating compositions made from anhydride components in which the molar ratio of vinyl monomer to ethylenically unsaturated carboxylic acid anhydride is too low, yellow to an undesirable extend when the anhydride component is combined with the hydroxyl component.

What is claimed is:

1. A non-yellowing coating composition comprising:
   (A) a hydroxy component having at least two free hydroxy groups per molecule; and
   (B) an anhydride component having at least two carboxylic acid anhydride groups per molecule derived from a mixture of monomers comprising greater than or equal to 11 percent by weight of an ethylenically unsaturated carboxylic acid anhydride the balance of said mixture comprisied of at least one vinyl comonomer, the molar ratio of said vinyl comonomer to said carboxylic acid anhydride being at least 1:0:1.0 and sufficient to provide a color standard number of less than 150 f according to ANSI/ASTI test method D 1209-69 when an amout of component (B) sufficient to provide 27 grams of solids of said component is mixed with 1.0 gram of dimethylcocoamine and reduced with butyl acetate to a solids content of 22.5 percent by weight;

wherein the amounts of said hydroxy componnents and said anhydide components in said coating composition provide a ratio of equivalents of hydroxyl groups to equivalents of anhydride groupsp in a range of from 3:1 to 1:3.

2. The coating composition of claim 1 wherein cures to a tack free film at a temperature of less than 75 degrees Celsius within 4 hours.

3. The coating composition of claim 1 which is in the form of a two package composition in which said hydroxy component is in a package separate from said anhydride component.

4. The coating composition of claim 1 which is essentially free of opaque pigments and when applied as a film cures to form a transparent crosslinked coating.

5. The coating composition of claim 1 additionally comprising (C) an effective amount of a catalytic agent for accelerating the curing reaction between hydroxyl groups of component (A) and anhydride groups of component (B).

6. The coating composition of claim 5 wherein said catalytic agent comprises an amino group.

7. The coating composition of claim 1 wherein said hydroxy component is selected from the group consisting of simple diols, triols and higher hydric alcohols; an acrylic polyol; a polyester polyol; a urethane polyol; a polyether polyol; an amide-containing polyol; an epoxy polyol; and a mixture thereof.

8. The coating composition of claim 7 wherein said hydroxy component is a film-forming polymer.

9. The coating composition of claim 8 wherein said film-forming polymer is an acrylic polyol derived from a hydroxyalkyl acrylate and/or a hydroxyalkyl methacrylate.

10. The coating composition of claim 9 wherein said acrylic polyol has a peak molecular weight ranging from about 1000 to about 50000 and said anhydride component is a film-forming polymer having a peak molecular weight ranging from about 1000 to about 50000, said molecular weights being determined by gel permeation chromatography utilizing a polystyrene standard.

11. The coating composition of claim 1 wherein said vinyl monomer comprises styrene.

12. The coating composition of claim 1 wherein the molar ratio of said vinyl comonomer to said carboxylic acid anhydride is at least 1.3:1.0.

13. The coating composition of claim 1 which when applied as a film cures to form a crosslinked coating.

14. A method of coating comprising the steps of:
   (I) coating a substrate with one or more applications of a pigmented basecoating composition to form a basecoat; and
   (II) coating said basecoat with one or more applications of a transparent topcoating composition to form a transparent topcoat; wherein at least one application of said basecoating composition and said topcoating composition is a non-yellowing coating composition comprising
   (A) a hydroxy component having at least two free hydroxyl groups per molecule; and
   (B) an anhydride component having at least two carboxylic acid anhydride groups per molecule derived from a mixture of monomers comprising greater than or equal to 11 percent by weight of an ethylenically unsaturated carboxylic acid anhydride the balance of said mixture comprised of at least one vinyl comonomer, the molar ratio of said vinyl comonomer to said carboxylic acid anhydride being at least 1.0:1.0 and sufficient to provide a color standard number of less than 150 according to ANSI/ASTM test method D 1209-69 when an amount of component (B) sufficient to provide 27 grams of solids of said component is mixed with 1.0 gram of dimethylcocoamine and reduced with butyl acetate to a solids content of 22.5 percent by weight;

wherein the amounts of said hydroxy component and said anhydride component in said non-yellowing coating composition provide a ratio of equivalents of hydroxyl groups to equivalents of anhydride groups in a range of from 3:1 to 1:3.

15. The method of claim 14 wherein said transparent topcoating composition comprises said non-yellowing coating composition.

16. The method of claim 14 wherein said basecoat and said topcoat are allowed to dry or cure together on said substrate.

17. The method of claim 14 in which said non-yellowing coating composition is in the form of a two package composition in which said hydroxy component is in a package separate from said anhydride component.

18. The method of claim 14 wherein said non-yellowing coating composition additionally comprises (C) an effective amount of a catalytic agent for accelerating the curing reaction between hydroxyl groups of component (A) and anhydride groups of component (B).

19. The method of claim 17 wherein said catalytic agent comprises an amino group.

20. The method of claim 14 wherein said hydroxy component is selected from the group consisting of simple diols, triols and higher hydric alcohols; an acrylic polyol; a polyester polyol; a urethane polyol; a polyether polyol; an amide-containing polyol; an epoxy polyol; and a mixture thereof.

21. The method of claim 20 wherein said hydroxy component is a film-forming polymer.

22. The method of claim 21 wherein said film-forming polymer is an acrylic polyol derived from a hydroxyalkyl acrylate and/or a hydroxyalkyl methacrylate.

23. The method of claim 22 wherein said acrylic polyol has a peak molecular weight ranging from about 1000 to about 50000 and said second film-forming polymer has a peak molecular weight ranging from about 1000 to about 50000, said molecular weights being determined by gel permeation chromatography utilizing a polystyrene standard.

24. The method of claim 14 wherein said vinyl monomer comprises styrene.

25. The method of claim 14 wherein the molar ratio of said vinyl comonomer to said carboxylic acid anhydride is at least 1.3:1.0.

* * * * *

UNITED STATES PATENT AND TRADEMARK OFFICE
CERTIFICATE OF CORRECTION

PATENT NO.  : 4,798,745

DATED       : January 17, 1989

INVENTOR(S) : Jonathan T. Martz, James B. O'Dwyer, Stephen J. Thomas and James A. Claar It is certified that error appears in the above-identified patent and that said Letters Patent is hereby corrected as shown below:

In Claim 1, column 21, line 20, "comprisied" should read --comprised--.

In Claim 1, column 21, line 24, please delete the "f" after 150.

In Claim 1, column 21, line 25, "ASTI" should read --ASTM--.

In Claim 1, column 21, line 31, "componaents" should read --component--.

In Claim 1, column 21, line 32, "anhydide" should read --anhydride--.
         column 21, line 32, "componnents" should read --component--.
In Claim 1, column 21, line 34, "groupsp" should read --groups--.

Signed and Sealed this

Twentieth Day of April, 1993

Attest:

MICHAEL K. KIRK

*Attesting Officer*    Acting Commissioner of Patents and Trademarks